Patented Oct. 16, 1945

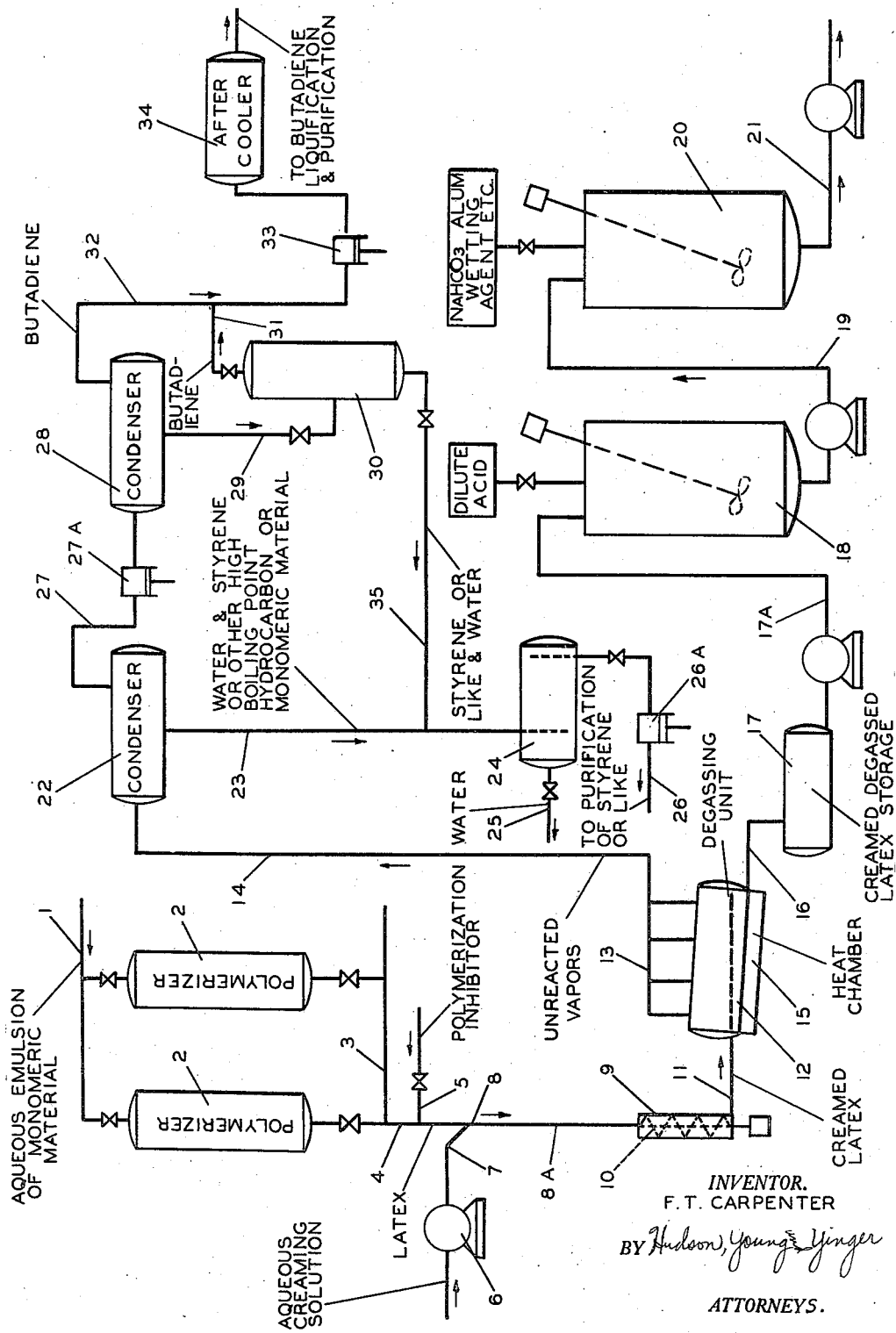

2,386,931

UNITED STATES PATENT OFFICE 2,386,931

PRODUCTION OF SYNTHETIC RUBBER

Frank T. Carpenter, Dearborn, Mich., assignor to Phillips Petroleum Company, a corporation of Delaware Application May 3, 1943, Serial No. 485,487

6 Claims. (Cl. 260—86.5)

This invention relates to the production of synthetic rubber and more particularly to an improved method of effecting degassing of the latex, i. e. removal of unreacted or unpolymerized materials from the synthetic rubber latex.

Conventional practice in the production of synthetic rubber involves taking the latex as it is prepared in the polymerization unit, with or without the addition of a suitable inhibitor thereto to stop or freeze the polymerization and prevent further subsequent polymerization, and immediately subjecting it to a degassing step to strip any unreacted monomers or similar volatile organic material therefrom. The degassing is carried out by application of heat and the evacuation of the volatile organic materials from the latex. Following degassing, conventional practice is to cream the degassed latex by the addition of brine, caustic solution or other creaming agent and intimate admixture and to then coagulate the latex by the addition to the creamed latex of sodium bicarbonate, alum, acid, etc. or by freezing. This converts the latex into a mass of crumb-like particles of coagulum which may then be washed and sheeted to give the raw rubber.

Present methods of degassing use steam as the source of heat. Under one continuous method now in existence, a thin layer of the latex, approximately four inches in depth is agitated and heated by the direct introduction of live steam under the surface of the liquid latex while drawing a vacuum. This causes bubbling, due to the presence of a dispersing agent (usually soap) in the latex, and this bubbling assists in the dispersion of unreacted monomers and other similar volatile organic compounds which are present and also serves as a lubricant for the surfaces of the degassing vessel. However, the speed with which such a process can operate is greatly reduced as excessive agitation causes excessive bubbling or foaming which causes the evacuating medium to pull off excessive amounts of foam with the unreacted vapor, which requires additional condenser and separation facilities. As a result it is necessary to interpose foam knockout tanks or similar foam-catching and/or subsiding means which is expensive, adds to the complexity and is not altogether satisfactory.

Another serious disadvantage of present methods of degassing is that rubber deposits and builds up to an objectionable extent on the surfaces of the equipment with which the latex comes in contact. This build-up of rubber on equipment and pipe lines is very detrimental to continuous operation and extremely costly. This makes it necessary to maintain temperature relatively low, move the latex quite rapidly, and in limited quantities.

Still another difficulty with existing methods of degassing is that while it is possible to remove 100% of the butadiene (where that is the diolefin used) it is possible in conjunction with expedient and economical production, to remove only 75–90% of the styrene or acrylonitrile or other material of comparable volatility such as methyl methacrylate, benzene, etc. Therefore it is very desirable to have available a method of latex treatment which allows the use of a higher temperature in the degassing step whereby greater percentages of styrene, acrylonitrile, benzene, etc., may be removed from the latex in the degassing step. The removal of the diolefin and of the "co-monomer" from the latex by the degassing step makes the latex safe to handle from a health hazard standpoint, and prevents continued polymerization due to atmospheric temperatures, or in other words makes the finished product "stable." Accordingly a maximum degree of removal of the monomeric materials is desired in order to promote maximum stability.

Another disadvantage encountered when degassing is incomplete is that the odor of unreacted hydrocarbons given off at the time of drying the rubber at elevated temperatures is very objectionable and prevents the attainment of satisfactory working conditions.

It is often desirable in the production of certain types of synthetic rubber to use benzene as a solvent or dispersing medium for the polymerization inhibitor or age-resistor (often phenyl beta-naphthylamine) added to the latex immediately upon withdrawal of the latex from the polymerizer for the purpose of stopping or freezing the polymerization. However, benzene is injurious to the health of workmen, being absorbed through the skin. Because with present methods of degassing it is impossible to remove the added benzene completely, it has not been feasible to use benzene in this manner. Accordingly it is very advantageous to provide a process which enables the use of benzene by effecting its removal in the degassing step so completely that the hazard of injury to the health of the workmen is prevented.

The boiling points of the several compounds most apt to be presented by the latex for removal in the degassing step are as follows:

*Monomeric compounds*

| A. Diolefins: | Boiling point °C. |
|---|---|
| Butadiene | −5 |
| Isoprene | 34 |
| Piperylenes | 42–4 |
| 2,3-dimethyl butadiene | 69.5 |
| Hexadiene-2,4 | 82 |
| B. Co-monomers: | |
| Styrene | 145 |
| Acrylonitrile | 78 |
| Methyl methacrylate | 105 |

*Other organic materials*

Benzene _____ 80

It will be seen that while butadiene is normally gaseous and therefore very easily removed and the C₅ diolefins are fairly readily removed, complete removal of the other materials at the moderate degassing temperatures commonly employed is very difficult or impossible.

Still another reason why a more complete and efficient degassing of the latex than known at present is very desirable in the synthetic rubber industry is that it is highly advantageous to stop the polymerization substantially before completion. That incomplete polymerization adds a great deal of capacity to a given polymerizing unit is shown by the following table of typical figures for time of reaction compared to per cent of completion:

| Percent complete reaction | Time required |
|---|---|
| | Hours |
| 50% complete | 5-6 |
| 70% complete | 8-10 |
| 80% complete | 13-15 |
| 90% complete | 24-26 |
| 95% complete | 38-42 |

From the table just given it will be seen that if a process can be made available whereby the polymerization can be stopped at 70-80% of completion and the unreacted diolefin and co-monomers completely recovered in the degassing step, approximately three times the production from a given polymerizer will be obtained. This is extremely advantageous because polymerizer equipment is very expensive. Complete recovery of the unreacted diolefin and co-monomers is very important because they are very valuable.

The principal object of the present invention is to provide an improved process for the production of synthetic rubber. Another object is to provide an improved method of degassing of synthetic rubber latex. Another object is to provide a novel sequence of steps which enables the use of higher temperatures in the degassing step without the accumulation of rubber on surfaces of equipment and which effects much more complete removal of the unreacted monomers and other organic materials from the latex in the degassing step, and which thereby makes feasible the cessation of polymerization at a point well short of completion with the attendant advantages of greater capacity with equipment of a given size. Numerous other objects will more fully hereinafter appear.

The accompanying drawing portrays diagrammatically one arrangement of equipment suitable for carrying out the process of the present invention.

In accordance with the present invention, the latex is degassed after it has been creamed. By interposing the creaming step between the polymerization and the degassing steps instead of operating in the conventional manner wherein the creaming is done after degassing and before coagulation, important new advantages result.

Among the advantages obtained are the fact that the process of the present invention eliminates the excessive build-up of rubber where the creamed latex comes in contact with surfaces and permits greater simplification in design of degassing equipment. The process of the present invention enables the use of higher degassing temperatures and eliminates excessive foaming in the degassing step. By creaming the latex the trouble from accumulation of rubber on surfaces is eliminated and the creamed latex can therefore be heated without excessive agitation and excessive foaming is thereby prevented. In accordance with the present invention the degassing can be carried out in much smaller and much less expensive equipment and with much less operating trouble.

Another advantage of the present invention is that the polymerization can be stopped well before completion, preferably at not over 80% of completion, whereby the synthetic rubber production from given polymerization equipment is much increased. This is possible because the present invention enables the complete removal and recovery of the unreacted diolefin, co-monomers and other like organic material. Numerous other advantages of the present invention will be at once apparent to those skilled in the art. Thus the invention makes feasible the use of benzene as a solvent or dispersing medium for the polymerization inhibitor added immediately upon withdrawal of the latex from the polymerizing unit. The process permits elimination of foam head tanks from the degassing equipment because it eliminates the foaming. It permits greater flexibility in operation or degassing.

The details of the creaming step of the present invention need not be given since it is a conventional step well within the present-day skill of the art. The latex may be creamed with brine, caustic or other materials. My invention does not reside in the creaming step per se but in the peculiarly advantageous sequence of steps whereby the latex is creamed and is directly degassed. The creaming step is usually carried out at substantially atmospheric pressure. The degassing is preferably carried out at atmospheric pressure or lower because lower temperatures can be employed at such pressures. It is ordinarily preferred to remove the product from the polymerizer as soon as possible because of the high cost of polymerizer equipment. It would not ordinarily be practical or desirable to carry out the creaming under pressure or in the polymerizer.

The creaming, degassing and coagulation may be carried out either continuously or batchwise, continuous operation being preferred. As explained above, customary practice is to degas and to then cream and coagulate. Creaming is really a part of the coagulation process being the first step thereof and my invention involves the novel perception that by creaming before degassing important advantages not hitherto realized would be obtained.

The invention is applicable to all types of synthetic latices. It is advantageous to degas all synthetic latices before processing. The invention is applicable whether the monomeric material consist of diolefin such as butadiene, isoprene, piperylene, etc., and mixtures thereof or whether it consist of diolefin and co-monomeric material such as styrene, acrylonitrile, etc.

Referring to the drawing, an aqueous emulsion of monomeric material enters via line 1 and passes by suitable manifolding into one of polymerizing units 2. The latex produced is withdrawn by header 3 and fed into line 4. A solution or dispersion of a suitable polymerization inhibitor may be added at once by means of line 5. The latex then passes along line 4 and a creaming solution is fed into admixture therewith by means of pump 6, line 7 and mixing Y designated 8. The resulting mixture may then be passed via line 8a into an enlarged section 9, equipped if desired with agitating means 10, whence it passes via line 11 to the degassing unit 12. Sections 9 and 11 may be enlarged or may be of the same size as conduit 8a. It will be obvious that the size and design of the equipment beginning with mixing Y 8 and extending through conduit 11 are such that the desired intimacy of contact and length of time of residence effect complete creaming of the latex. This is a matter well within the skill of the art.

The degassing unit 12 comprises a pipe of relatively large diameter and of sufficient length to accomplish degassing of the latex. The level of the latex in unit 12 may be at any suitable point therein, usually somewhere below the middle whereby a substantial vapor space is provided within which any slight foam formed may subside. A manifold 13 with multiple withdrawal lines is connected to the vapor space and this connects with conduit 14 which leads to the recovery and purification system for the degassed vapor. However, these withdrawal lines need not be manifolded, but may be conducted separately to appropriate condensers, separators, etc. The degassing unit 12 may desirably be tilted at a slight angle to the horizontal, the exit end being slightly lower than the entrance end. To supply heat for the degassing operation, a heat chamber 15 is provided in association with the bottom of the unit 12. This may be heated by steam, gas, electricity, oil or any other generator of heat for raising the temperature of the creamed latex. Instead of chamber 15, I may provide heating coils located within the unit 12.

It will be apparent that the invention does not reside in the particular creaming and degassing method and means illustrated per se but that any other suitable method of effecting the creaming and degassing operations may be used, provided they are in the sequence shown namely creaming followed directly by degassing.

The degassed creamed latex leaves unit 12 via line 16 and passes to storage 17 whence it may be passed via pipe 17a into coagulating tank 18 where it is coagulated with dilute acid and thence passed via line 19 to a second tank 20 where it is admixed with sodium bicarbonate, alum, a suitable wetting agent, etc. These steps do not per se constitute any part of the present invention. The finished coagulated latex may pass via line 21 to any further processing steps such as washing, sheeting, compounding, etc.

A typical vapor recovery system has been illustrated for the recovery of the degassed vapors. This system exerts a vacuum on the degassing unit 12 by reason of vacuum pumps. However, it will be obvious that any other means of exerting the vacuum on unit 12 and of recovering the components of the degassed vapors may be employed. In the system shown the vapors in line 14 pass into a first condenser 22 having the water leg 23 and in which the water and much of the high boiling organic material are condensed. This organic material may be monomeric styrene, acrylonitrile, methyl methacrylate or the like or a solvent such as benzene. The condensate accumulates in separation tank 24 from which the heavier water layer is removed via line 25 and the lighter styrene layer via vacuum pump 26A and line 26 whence the latter passes to any purification steps desired. The uncondensed vapors pass from condenser 22 via line 27 and vacuum pump 27a into a second condenser 28 wherein the balance of the water and high-boiling organic material like styrene are condensed out together with some condensed or dissolved butadiene. The condensate flows via the water leg 29 into a flash tank 30 wherein the butadiene is flashed off and passes via line 31 into admixture with the uncondensed butadiene flowing in line 32. The combined butadiene vapors pass into vacuum pump 33 whence they pass into after-cooler 34 from which they may be passed to any suitable liquefaction and/or purification steps. The water and styrene separated in unit 30 passes via line 35 into the stream in line 29 flowing to separator 24.

Degassing by means of the present invention also permits the removal of the unreacted hydrocarbon in a multiplicity of steps or stages, with a minimum amount of equipment and expense. Since the degassing unit itself requires a minimum amount of material and expense, and since the unreacted hydrocarbon or monomeric material will fractionate at various known temperatures, it will frequently be desirable to carry it out in a series of degassing steps. Thus the $C_4$ may be removed in the first step, the $C_5$ in the second step, and the higher boiling materials in another step or steps. In this way separation of these hydrocarbons or monomeric materials in supplemental equipment is greatly simplified.

In addition to the advantages enumerated above, the present invention is further advantageous because it enables the operator to increase the ratio of styrene and/or acrylonitrile to butadiene in the copolymer, with complete removal of the unreacted styrene and acrylonitrile in the degassing step. This possibility of increasing the ratio of $C_5$ and heavier hydrocarbons or monomeric components to $C_4$ in the synthetic rubber with ability to completely remove the unreacted $C_5$ and heavier components with readily available equipment due to the ability to increase the temperature of the creamed latex without unsatisfactory operating difficulties is highly advantageous to the synthetic rubber manufacturer.

From the foregoing it will be seen that the present invention provides a highly improved method for the degassing of synthetic latex which method is unique and very advantageous.

I claim:

1. In the process of producing synthetic rubber by series of steps including emulsion polymerization of monomeric material including an aliphatic conjugated diolefin to yield a latex of synthetic rubber containing volatile organic material including unpolymerized monomeric material, the improvement which comprises creaming said latex and subsequently degassing said creamed latex to remove therefrom said volatile organic material.

2. In the process of producing synthetic rubber by a series of steps including emulsion polymerization of monomeric material including an aliphatic conjugated diolefin to yield a latex of synthetic rubber containing volatile organic material including unpolymerized monomeric material, the improvement which comprises creaming said latex, subsequently degassing said creamed latex to remove therefrom said volatile organic material, and coagulating the degassed creamed latex.

3. The process of producing synthetic rubber which comprises carrying out emulsion polymerization of volatile monomeric material comprising an aliphatic conjugated diolefin, stopping said polymerization at a point not over 80% of completion and thereby producing a latex of sythetic rubber containing unpolymerized volatile monomeric material, creaming said latex, and subsequently degassing said creamed latex to substantially completely remove therefrom the volatile organic material content thereof including said unpolymerized volatile monomeric material.

4. The process of producing synthetic rubber which comprises carrying out emulsion polymerization of butadiene and volatile co-monomeric material, stopping said polymerization at a point not over 80% of completion and thereby producing a latex of synthetic rubber containing unpolymerized butadiene and volatile co-monomeric material, creaming said latex, and subsequently degassing said creamed latex to substantially completely remove therefrom said unpolymerized butadiene and volatile co-monomeric material.

5. The process of producing synthetic rubber which comprises carrying out emulsion polymerization of butadiene and styrene, stopping said polymerization at a point not over 80% of completion and thereby producing a latex of synthetic rubber containing unpolymerized butadiene and styrene, creaming said latex, and subsequently degassing said creamed latex to substantially completely remove therefrom said unpolymerized butadiene and styrene.

6. The process of producing synthetic rubber which comprises carrying out emulsion polymerization of butadiene and volatile co-monomeric material to produce a latex of synthetic rubber containing unpolymerized butadiene and volatile co-monomeric material, adding to said latex immediately upon withdrawal thereof from the polymerization zone a mixture of polymerization inhibitor with benzene as an extending medium and thereby stopping the polymerization, creaming the resulting latex, and subsequently degassing the creamed latex to substantially completely remove therefrom said unpolymerized butadiene and styrene and said benzene.

FRANK T. CARPENTER.